United States Patent
Schowengerdt et al.

(10) Patent No.: US 11,500,208 B2
(45) Date of Patent: Nov. 15, 2022

(54) VIRTUAL AND AUGMENTED REALITY SYSTEMS AND METHODS HAVING UNEQUAL NUMBERS OF COMPONENT COLOR IMAGES DISTRIBUTED ACROSS DEPTH PLANES

(71) Applicant: Magic Leap, Inc., Plantation, FL (US)

(72) Inventors: Brian T. Schowengerdt, Seattle, WA (US); Hong Hua, Tucson, AZ (US); Hui-Chuan Cheng, Cooper City, FL (US); Christophe Peroz, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 25 days.

(21) Appl. No.: 17/145,156

(22) Filed: Jan. 8, 2021

(65) Prior Publication Data

US 2021/0132393 A1    May 6, 2021

Related U.S. Application Data

(63) Continuation of application No. 16/584,549, filed on Sep. 26, 2019, now Pat. No. 10,890,773, which is a
(Continued)

(51) Int. Cl.
*G02B 27/01* (2006.01)
*G02B 5/18* (2006.01)
(Continued)

(52) U.S. Cl.
CPC ........... *G02B 27/0172* (2013.01); *G02B 5/18* (2013.01); *G02B 6/0035* (2013.01);
(Continued)

(58) Field of Classification Search
CPC .... G02B 27/0172; G02B 5/18; G02B 6/0035; G02B 6/0076; G02B 2027/0112;
(Continued)

(56) References Cited

U.S. PATENT DOCUMENTS 6,850,221 B1   2/2005   Tickle
D514,570  S    2/2006   Ohta
(Continued)

FOREIGN PATENT DOCUMENTS

JP    2000-115812 A    4/2000
JP    2015-118273      6/2015
(Continued)

OTHER PUBLICATIONS

European Extended Search Report, re EP Application No. 177363629, dated Jul. 26, 2019.
(Continued)

*Primary Examiner* — Maurice L. McDowell, Jr.
(74) *Attorney, Agent, or Firm* — Knobbe, Martens, Olson & Bear, LLP

(57) ABSTRACT

Images perceived to be substantially full color or multi-colored may be formed using component color images that are distributed in unequal numbers across a plurality of depth planes. The distribution of component color images across the depth planes may vary based on color. In some embodiments, a display system includes a stack of waveguides that each output light of a particular color, with some colors having fewer numbers of associated waveguides than other colors. The stack of waveguides may include by multiple pluralities (e.g., first and second pluralities) of waveguides, each configured to produce an image by outputting light corresponding to a particular color. The total number of waveguides in the second plurality of waveguides is less than the total number of waveguides in the first plurality of waveguides, and may be more than the total number of waveguides in a third plurality of waveguides, in embodiments where three component colors are utilized.

20 Claims, 10 Drawing Sheets

Related U.S. Application Data continuation of application No. 15/399,548, filed on Jan. 5, 2017, now Pat. No. 10,466,480.

(60) Provisional application No. 62/275,987, filed on Jan. 7, 2016.

(51) Int. Cl.
| | |
|---|---|
| G06V 40/19 | (2022.01) |
| G06V 40/18 | (2022.01) |
| F21V 8/00 | (2006.01) |
| G06T 5/00 | (2006.01) |
| G06T 19/00 | (2011.01) |

(52) U.S. Cl.
CPC ............ *G02B 6/0076* (2013.01); *G06T 5/002* (2013.01); *G06T 19/006* (2013.01); *G06V 40/19* (2022.01); *G06V 40/193* (2022.01); *G02B 2027/014* (2013.01); *G02B 2027/0112* (2013.01); *G02B 2027/0125* (2013.01); *G02B 2027/0127* (2013.01); *G02B 2027/0132* (2013.01); *G02B 2027/0138* (2013.01); *G02B 2027/0178* (2013.01)

(58) Field of Classification Search
CPC .... G02B 2027/0125; G02B 2027/0127; G02B 2027/0132; G02B 2027/0138; G02B 2027/014; G02B 2027/0178; G06T 5/002; G06T 19/006; G06V 40/19; G06V 40/193
See application file for complete search history.

(56) References Cited

U.S. PATENT DOCUMENTS

| | | | |
|---|---|---|---|
| 8,248,458 | B2 | 8/2012 | Schowengerdt et al. |
| 8,950,867 | B2 | 2/2015 | Macnamara |
| 9,081,426 | B2 | 7/2015 | Armstrong |
| 9,164,351 | B2 | 10/2015 | Bohn |
| 9,215,293 | B2 | 12/2015 | Miller |
| D752,529 | S | 3/2016 | Loretan et al. |
| 9,310,559 | B2 | 4/2016 | Macnamara |
| 9,348,143 | B2 | 5/2016 | Gao et al. |
| D758,367 | S | 6/2016 | Natsume |
| D759,657 | S | 7/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,466,480 | B2 | 11/2019 | Schowengerdt et al. |
| 10,890,773 | B2 | 1/2021 | Schowengerdt et al. |
| 2006/0028436 | A1 | 2/2006 | Armstrong |
| 2006/0244907 | A1 | 11/2006 | Simmons |
| 2007/0081123 | A1 | 4/2007 | Lewis |
| 2007/0086074 | A1 | 4/2007 | Thies |
| 2009/0195790 | A1 | 8/2009 | Zhu et al. |
| 2010/0149073 | A1 | 6/2010 | Chaum et al. |
| 2011/0188116 | A1 | 8/2011 | Ledentsov |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0278631 | A1 | 10/2013 | Border et al. |
| 2013/0286053 | A1 | 10/2013 | Fleck et al. |
| 2013/0300634 | A1 | 11/2013 | White et al. |
| 2013/0314793 | A1* | 11/2013 | Robbins ............ G02B 27/0172 359/630 |
| 2013/0335404 | A1 | 12/2013 | Westerinen et al. |
| 2014/0003762 | A1 | 1/2014 | Macnamara |
| 2014/0064655 | A1* | 3/2014 | Nguyen ............ G02B 27/0081 385/11 |
| 2014/0071539 | A1 | 3/2014 | Gao |
| 2014/0140654 | A1 | 5/2014 | Brown et al. |
| 2014/0158872 | A1 | 6/2014 | Kallendrusch et al. |
| 2014/0168260 | A1* | 6/2014 | O'Brien ............ G02B 27/0172 385/134 |
| 2014/0177023 | A1 | 6/2014 | Gao et al. |
| 2014/0218468 | A1 | 8/2014 | Gao et al. |
| 2014/0218801 | A1 | 8/2014 | Simmonds et al. |
| 2014/0267420 | A1 | 9/2014 | Schowengerdt |
| 2014/0300966 | A1 | 10/2014 | Travers et al. |
| 2014/0306866 | A1 | 10/2014 | Miller et al. |
| 2015/0002528 | A1 | 1/2015 | Bohn et al. |
| 2015/0016777 | A1 | 1/2015 | Abovitz et al. |
| 2015/0103306 | A1 | 4/2015 | Kaji et al. |
| 2015/0138248 | A1 | 5/2015 | Schrader |
| 2015/0178939 | A1 | 6/2015 | Bradski et al. |
| 2015/0187330 | A1 | 7/2015 | Yang |
| 2015/0189266 | A1 | 7/2015 | Zhou |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0234477 | A1 | 8/2015 | Abovitz et al. |
| 2015/0241614 | A1 | 8/2015 | Ide et al. |
| 2015/0241705 | A1 | 8/2015 | Abovitz et al. |
| 2015/0268415 | A1 | 9/2015 | Schowengerdt et al. |
| 2015/0295610 | A1 | 10/2015 | Li et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0085300 | A1 | 3/2016 | Robbins et al. |
| 2016/0139402 | A1 | 5/2016 | Lapstun |
| 2016/0216517 | A1 | 7/2016 | Border |
| 2016/0259166 | A1 | 9/2016 | Border et al. |
| 2016/0274361 | A1 | 9/2016 | Border et al. |
| 2016/0327789 | A1 | 11/2016 | Klug et al. |
| 2016/0329028 | A1 | 11/2016 | Simmons |
| 2016/0379606 | A1 | 12/2016 | Kollin et al. |
| 2017/0003505 | A1 | 1/2017 | Vaiiius et al. |
| 2017/0003507 | A1 | 1/2017 | Raval et al. |
| 2017/0102543 | A1 | 4/2017 | Vaiiius |
| 2017/0108697 | A1 | 4/2017 | El-Ghoroury et al. |
| 2017/0212351 | A1 | 7/2017 | Schowengerdt et al. |
| 2017/0332071 | A1 | 11/2017 | Ledentsov et al. |
| 2020/0018972 | A1 | 1/2020 | Schowengerdt et al. |

FOREIGN PATENT DOCUMENTS

| | | |
|---|---|---|
| JP | 2015-525491 | 9/2015 |
| JP | 2015-525491 A | 9/2015 |
| WO | WO 2015/012024 | 1/2015 |
| WO | WO 2015/184412 | 12/2015 |
| WO | WO 2017/120372 | 7/2017 |

OTHER PUBLICATIONS

Invitation to Pay Additional Fees for PCT Application No. PCT/US2017/012385, dated Mar. 2, 2017.
International Search Report and Written Opinion for PCT Application No. PCT/US2017/012385, dated May 10, 2017.
International Preliminary Report on Patentability for PCT Application No. PCT/US2017/012385, dated Jul. 10, 2018.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.

(56) References Cited

OTHER PUBLICATIONS archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Marcos, S., et al., "The depth-of-field of the human eye from objective and subjective measurements," Vision Research, vol. 39, No. 12, Jun. 1, 1999.

Pölönen, M., et al., "Color Asymmetry in 3D Imaging: Influence on the Viewing Experience," 3D Research, vol. 3,No. 3, Sep. 1, 2012.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wang, B. et al., "Depth-of-Focus of the Human Eye: Theory and Clinical Implications", Survey of Ophthalmology, vol. 15, No. 1, Jan.-Feb. 2006, in 11 pages.

\* cited by examiner

VIRTUAL AND AUGMENTED REALITY SYSTEMS AND METHODS HAVING UNEQUAL NUMBERS OF COMPONENT COLOR IMAGES DISTRIBUTED ACROSS DEPTH PLANES

PRIORITY CLAIM

This application is a continuation of U.S. application Ser. No. 16/584,549, filed on Sep. 26, 2019, entitled VIRTUAL AND AUGMENTED REALITY SYSTEMS AND METHODS HAVING UNEQUAL NUMBERS OF COMPONENT COLOR IMAGES DISTRIBUTED ACROSS DEPTH PLANES, which is a continuation of U.S. application Ser. No. 15/399,548, filed on Jan. 5, 2017, entitled VIRTUAL AND AUGMENTED REALITY SYSTEMS AND METHODS HAVING UNEQUAL NUMBERS OF COMPONENT COLOR IMAGES DISTRIBUTED ACROSS DEPTH PLANES, which claims the benefit of priority under 35 USC § 119(e) of U.S. Provisional Application No. 62/275,987, filed on Jan. 7, 2016, the entire disclosures of which are incorporated by reference herein.

INCORPORATION BY REFERENCE

This application incorporates by reference the entireties of each of the following patent applications: U.S. application Ser. No. 14/641,376 filed on Mar. 7, 2015; U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; and U.S. Provisional Application No. 62/156,809, filed May 4, 2015.

BACKGROUND

Field

The present disclosure relates to virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene (1) is depicted wherein a user of an AR technology sees a real-world park-like setting (1100) featuring people, trees, buildings in the background, and a concrete platform (1120). In addition to these items, the user of the AR technology also perceives that he "sees" a robot statue (1110) standing upon the real-world platform (1120), and a cartoon-like avatar character (1130) flying by which seems to be a personification of a bumble bee, even though these elements (1130, 1110) do not exist in the real world. Because the human visual perception system is complex, it is challenging to produce a VR or AR technology that facilitates a comfortable, natural-feeling, rich presentation of virtual image elements amongst other virtual or real-world imagery elements.

Systems and methods disclosed herein address various challenges related to VR and AR technology.

SUMMARY

In some embodiments, a display system is provided. The system includes a stack of waveguides that includes a first plurality of waveguides each configured to produce an image by outputting light of a first wavelength range; and a second plurality of waveguides each configured to produce an image by outputting light of a second wavelength range. The first plurality of waveguides has a total number of waveguides that is greater than a total number of waveguides forming the second plurality of waveguides. The system may also include a third plurality of waveguides each configured to display an image by outputting light corresponding to a third wavelength range. The third plurality of waveguides may include a total number of waveguides that is different from the number of waveguides in the first or second pluralities of waveguides. In some embodiments, the first wavelength range encompasses light of the color green, the second wavelength range encompasses light of the color red, and the third wavelength range encompasses light of the color blue.

In some other embodiments, a display system is provided. The display system comprises a display configured to output a plurality of component color images, the component color images corresponding to a plurality of depth planes. Component color images of a first color total a greater number than component color images of a second color. The component color images of the first color are formed by light having a wavelength within a first wavelength range, and the component color images of the second color are formed by light having a wavelength within a second wavelength range.

The system includes a stack of waveguides that includes a first plurality of waveguides each configured to produce an image by outputting light corresponding to a first color; and a second plurality of waveguides each configured to produce an image by outputting light corresponding to a second color different from the first color. The system also includes a controller configured to introduce, based on the contents of the image to be produced by a waveguide of the first or second pluralities of waveguides, one or more of the following to the image: blur; and a change in pixel size.

In other embodiments, a display system comprises one or more waveguides, that comprise: a first plurality of diffractive optical elements configured to outcouple light of a first wavelength range to produce a first plurality of component color images; and a second plurality of diffractive optical elements configured to outcouple light of a second wavelength range to produce a second plurality of component color images. The images of the first plurality of component color images are set on one of X maximum possible depth planes for the first plurality of diffractive optical elements; and images of the second plurality of component color images are set on one of Y maximum possible depth planes for the second plurality of diffractive optical elements. X and Y are different whole numbers.

In some other embodiments, a display system is provided. The system includes a camera for determining pupil size, a stack of waveguides, and a controller. The stack of waveguides includes a first plurality of waveguides each configured to produce an image by outputting light corresponding to a first color; and a second plurality of waveguides each configured to produce an image by outputting light corresponding to a second color different from the first color. The controller is configured to vary properties of the outputted light based upon the determined pupil size.

DETAILED DESCRIPTION

Figure 1:
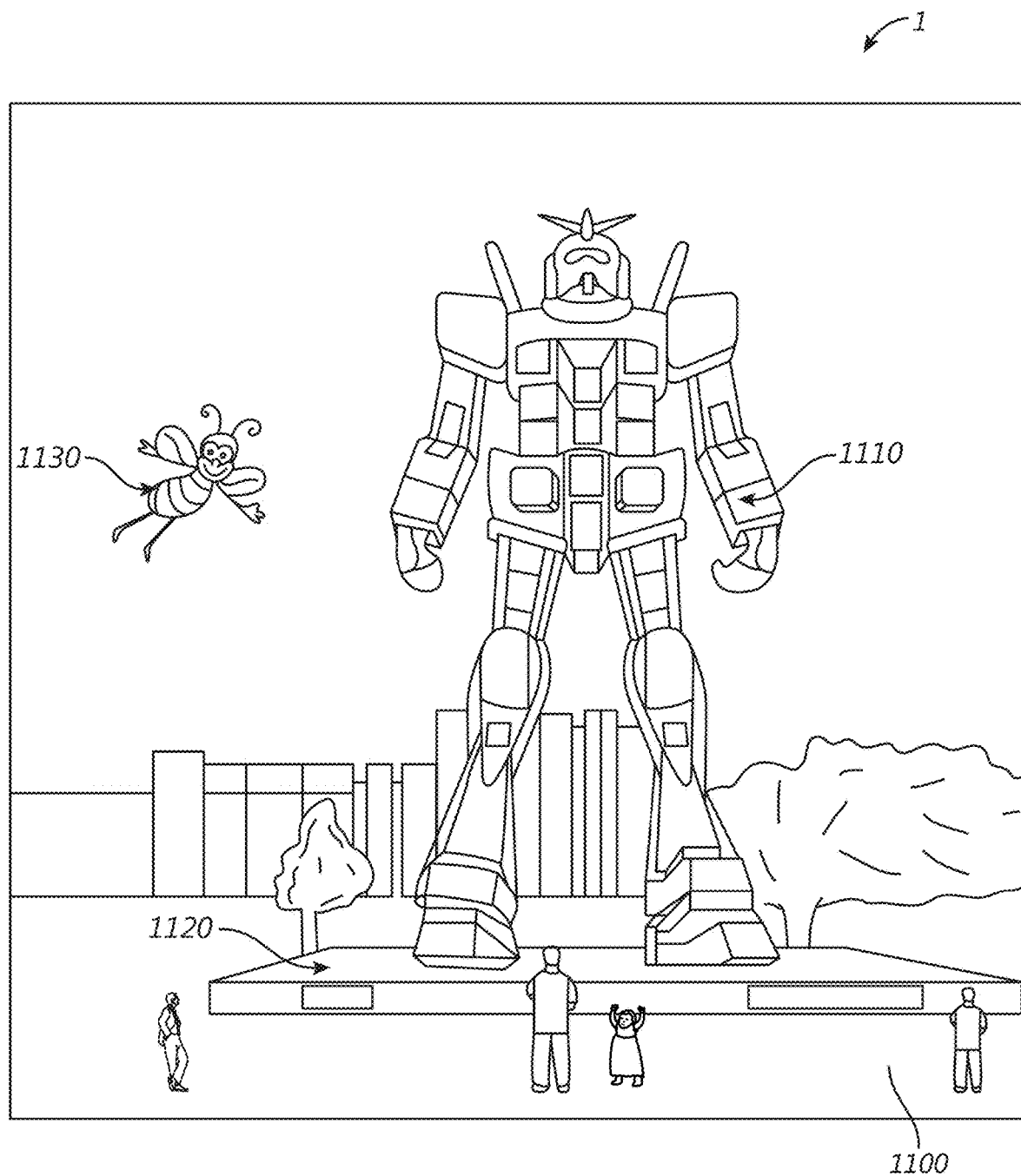
FIG. 1 illustrates a user's view of augmented reality (AR) through an AR device.

VR and AR experiences can be provided by display systems having displays in which images corresponding to a plurality of depth planes are provided to a viewer. The images may be different for each depth plane (e.g. provide slightly different presentations of a scene or object) and may be separately focused by the viewer's eyes. As a result, the user is provided with depth cues based on the accommodation of the eye required to bring into focus different image features for the scene located on different depth planes and/or based on observing different image features on different depth planes being out of focus. As discussed elsewhere herein, such depth cues provide credible perceptions of depth.

In some configurations, at each depth plane, a full color image may be formed by overlaying component images that each have a particular component color. For example, red, green, and blue images may each be outputted to form each full color image. As a result, each depth plane may have multiple component color images associated with it. Consequently, a large number of component color images may undesirably be required in order to provide full color images for the desired number of depth planes.

It has been found that credible perceptions of depth and the perception of substantially full color images may be achieved without providing component color images for every component color at every depth plane presented by a display. Without being limited by theory, it is believed that the depth of field for different colors may vary. Stated another way, the human eye may have different sensitivities when imaging light of different wavelengths, such that images or features clearly discernible to be on different depth planes at one color may not be perceived to be on different depth planes at another color. For example, two images on different depth planes may appear sufficiently in focus for one color but not in focus for another color. As such, the depth of field (or alternatively depth of focus) is considered to be different for different colors. In addition, it may be possible to manipulate the perceived depth of field for different colors, or the sensitivity of the eye to discerning depth cues for different component colors, as disclosed herein. Such manipulation can reduce the number of depth planes that may be discerned by the eye.

In some embodiments, images perceived to be substantially full color may be formed using component color images that are distributed across a plurality of depth planes in unequal numbers. For example, rather than providing images of each component color for each depth plane presented by a display, the distribution of component color images across the depth planes may vary based on color. For example, the total number of images of a first component color distributed across the depth planes may be different from the total number of images of a second component color. In some embodiments, the total number of images of a third component color may be different from the total for the first or second component colors. In some embodiments, at least one component color has a different total number of images from another component color. In some other embodiments, all component colors have a different total number of images from one another. In some embodiments, the total number of images of a particular component color is chosen based upon the sensitivity of the eye for differentiating different depth planes using wavelengths of light corresponding to that color. For example, where the component colors are red, green, and blue, the total number of green component images may be greater than the total number of red component images, which may be greater than the total number of blue component images. As a result, in some embodiments, the separation in depth between green component images may be shorter than for red component images. This configuration may be feasible because the eye may have an increased depth of field or focus for red light in comparison to green light, such that two red images are in focus despite being separated by a depth that is beyond the depth of field or focus for similarly located green images.

In some embodiments, image information may be projected or outputted by a stack of waveguides. In some embodiments, a display system includes waveguides that each output light of a particular color, with some colors having fewer numbers of associated waveguides than other colors, as discussed above. For example, the display system may include a stack of waveguides, formed by multiple pluralities (e.g., first and second pluralities) of waveguides. Each plurality of waveguides is configured to produce an image by outputting light corresponding to a particular color. The total number of waveguides in the second plurality of waveguides is less than the total number of waveguides in the first plurality of waveguides. In some embodiments, where full-color images may be formed by three or more component colors, there may be correspondingly three or more pluralities of waveguides (e.g., first, second, and third pluralities of waveguides).

In some embodiments, the first plurality of waveguides may be configured to output green light (that is, light of wavelength(s) corresponding to the perceived color green), the second plurality of waveguides may be configured to output blue light (light of wavelength(s) corresponding to the perceived color green), and the third plurality of waveguides may be configured to output red light (light of wavelength(s) corresponding to the perceived color green).

The second plurality of waveguides (for outputting blue light) may include a fewer total number of waveguides than the first or third pluralities of waveguides (for outputting green and red light, respectively). In addition, in some embodiments, the total number waveguides in the third plurality of waveguides may be fewer than in the first plurality of waveguides, or vice versa.

In some embodiments, one or more waveguides may include optical elements that are configured to outcouple light to form images for two or more depth planes. For example, the waveguides may include optical elements, such as diffractive optical elements, that are switchable between "on" states in which they are configured to outcouple, or redirect, light and "off" states in which they do not appreciably outcouple light. In some embodiments, a single waveguide, or individual ones of a stack of waveguides, may include multiple sets of optical elements, with each set configured to form images of a particular color for a particular depth plane. Once a set of optical elements outcouples light to form a particular component color image on a particular depth plane, it may be switched off, and another set of optical elements may be turned on to form another particular component color image on a particular depth plane.

In some embodiments, a display may include at least one waveguide with optical elements that are configured to outcouple light of multiple different colors, without the optical elements being switchable between on and off states. For example, a single waveguide may include multiple sets of optical elements, with each set configured to outcouple light of a different color. The different sets may have optical activity that is selective for one or more particular wavelengths of light, thereby allowing different component color images to be formed using a single waveguide.

It will be appreciated that embodiments disclosed herein may provide one or more of the following advantages. For example, because light from the outside world and light from some waveguides propagate through the stack of waveguides to reach the viewer, optical artifacts such as reflections and/or other distortions may be caused as the light propagates through and interacts with the waveguides. Consequently, reducing the number waveguides may reduce these optical artifacts. Reducing the number of waveguides may also improve manufacturability and yield, and reduce device costs by, for example, reducing the number of parts utilized in a display system, thereby reducing the structural and electrical complexity of the display system. In addition, even where the number of waveguides is not reduced, reducing the number of component color images per depth plane may reduce the processing or computational load on ancillary image processing systems, since the systems would be required to process a less image information (since there are fewer total component color images to process). This may also improve display system performance by, for example, improving responsiveness and reducing latency by reducing the commitment of system resources for processing images.

Embodiments disclosed herein include display systems generally. In some embodiments, the display systems are wearable, which may advantageously provide a more immersive VR or AR experience. For example, displays containing waveguides for displaying multiple depth planes, e.g. a stack of waveguides, may be configured to be worn positioned in front of the eyes of a user, or viewer. In some embodiments, multiple waveguides, e.g. two stacks of waveguides, one for each eye of a viewer, may be utilized to provide different images to each eye.

Figure 2:
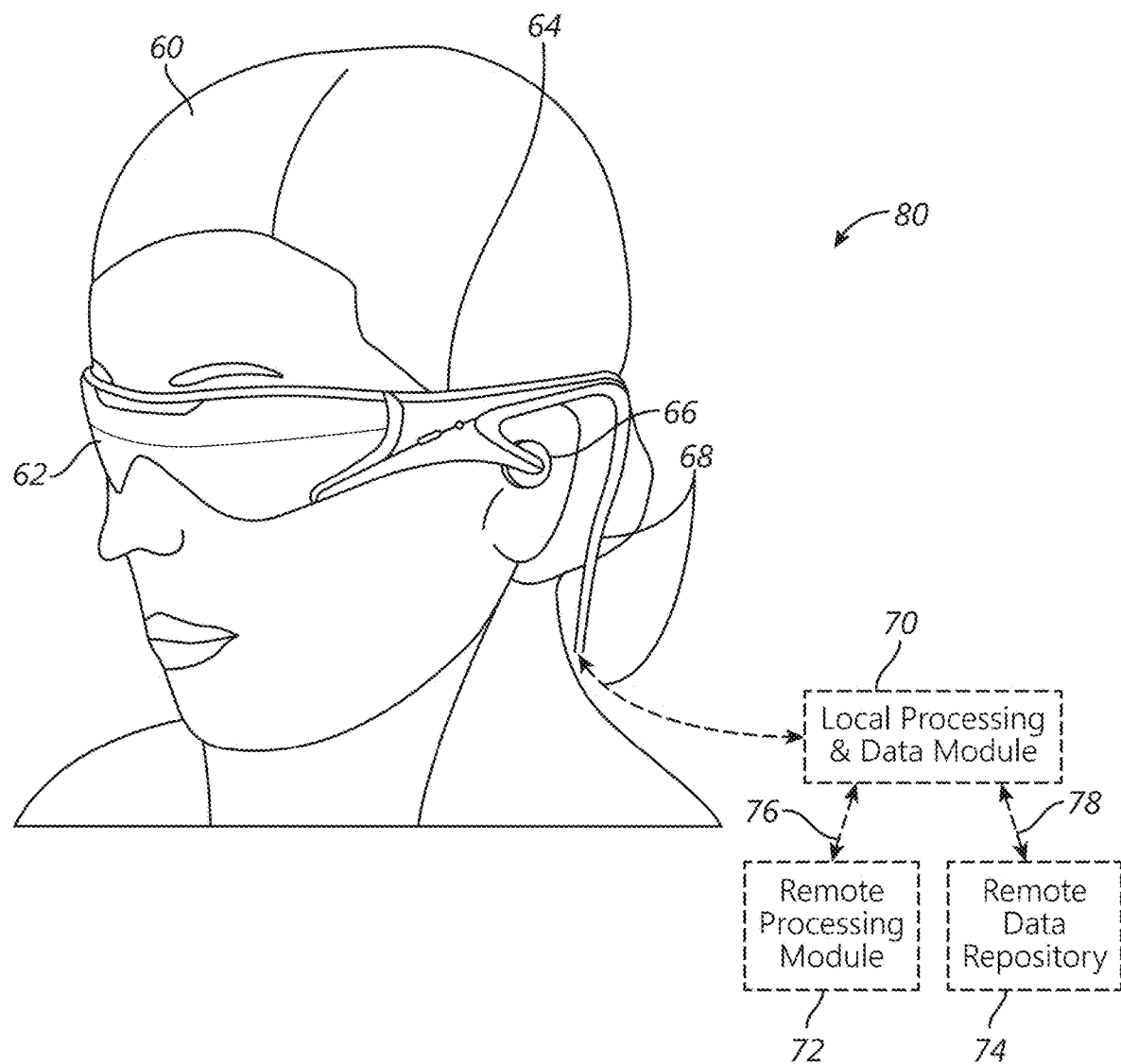
FIG. 2 illustrates an example of wearable display system.

FIG. 2 illustrates an example of wearable display system (80). The display system (80) includes a display (62), and various mechanical and electronic modules and systems to support the functioning of that display (62). The display (62) may be coupled to a frame (64), which is wearable by a display system user or viewer (60) and which is configured to position the display (62) in front of the eyes of the user (60). In some embodiments, a speaker (66) is coupled to the frame (64) and positioned adjacent the ear canal of the user (in some embodiments, another speaker, not shown, is positioned adjacent the other ear canal of the user to provide for stereo/shapeable sound control). The display (62) is operatively coupled (68), such as by a wired lead or wireless connectivity, to a local data processing module (70) which may be mounted in a variety of configurations, such as fixedly attached to the frame (64), fixedly attached to a helmet or hat worn by the user, embedded in headphones, or otherwise removably attached to the user (60) (e.g., in a backpack-style configuration, in a belt-coupling style configuration).

The local processing and data module (70) may comprise a processor, as well as digital memory, such as non-volatile memory (e.g., flash memory), both of which may be utilized to assist in the processing, caching, and storage of data. The data include data a) captured from sensors (which may be, e.g., operatively coupled to the frame (64) or otherwise attached to the user (60)), such as image capture devices (such as cameras), microphones, inertial measurement units, accelerometers, compasses, GPS units, radio devices, and/or gyros; and/or b) acquired and/or processed using remote processing module (72) and/or remote data repository (74), possibly for passage to the display (62) after such processing or retrieval. The local processing and data module (70) may be operatively coupled by communication links (76, 78), such as via a wired or wireless communication links, to the remote processing module (72) and remote data repository (74) such that these remote modules (72, 74) are operatively coupled to each other and available as resources to the local processing and data module (70).

In some embodiments, the remote processing module (72) may comprise one or more processors configured to analyze and process data and/or image information. In some embodiments, the remote data repository (74) may comprise a digital data storage facility, which may be available through the internet or other networking configuration in a "cloud" resource configuration. In some embodiments, all data is stored and all computations are performed in the local processing and data module, allowing fully autonomous use from a remote module.

Figure 3:
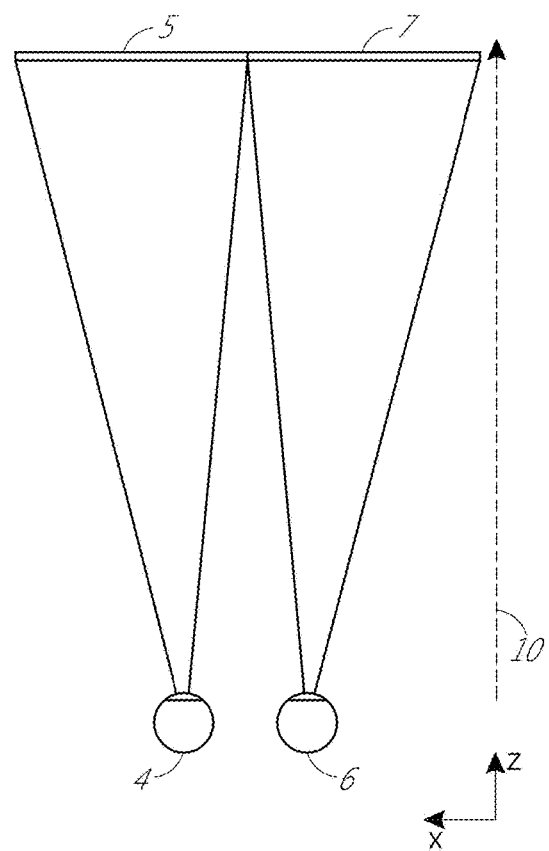
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images (5 and 7), one for each eye (4 and 6), are outputted to the user. The images (5 and 7) are spaced from the eyes (4 and 6) by a distance (10) along an optical or z-axis parallel to the line of sight of the viewer. The images (5 and 7) are flat and the eyes (4 and 6) may focus on the images by assuming a single accommodated state. Such systems rely on the human visual system to combine the images (5 and 7) to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
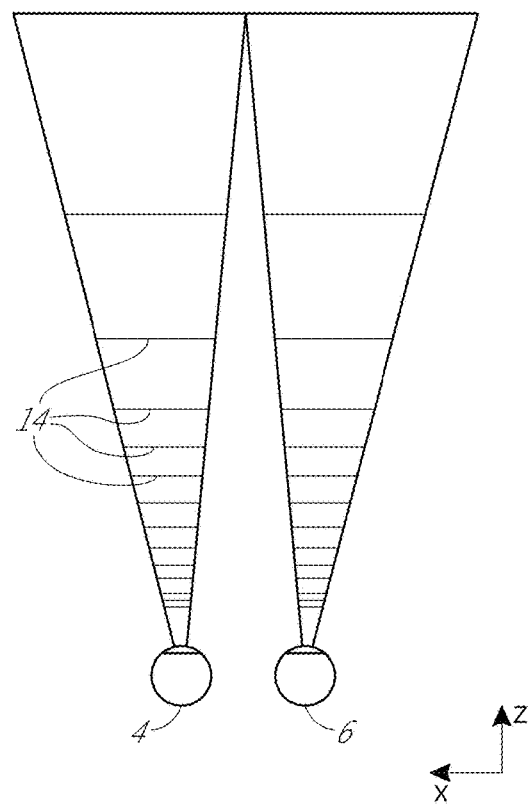
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4A, objects at various distances from eyes (4 and 6) on the z-axis are accommodated by the eyes (4, 6) so that those objects are in focus. The eyes (4 and 6) assume particular accommodated states to bring into focus objects at different distances along the z-axis. Consequently, a particular accommodated state may be said to be associated with a particular one of depth planes (14), with has an associated focal distance, such that objects or parts of objects in a particular depth plane are in focus when the eye is in the accommodated state for that depth plane. In some embodiments, three-dimensional imagery may be simulated by providing different presentations of an image for each of the eyes (4, 6), and also by providing different presentations of the image corresponding to each of the depth planes. While shown as being separate for clarity of illustration, it will be appreciated that the fields of view of the eyes (4, 6) may overlap, for example, as distance along the z-axis increases. It will addition, while shown as flat for ease of illustration, it will be appreciated that the contours of a depth plane may be curved in physical space, such that all features in a depth plane are in focus with the eye in a particular accommodated state.

Figure 5A:
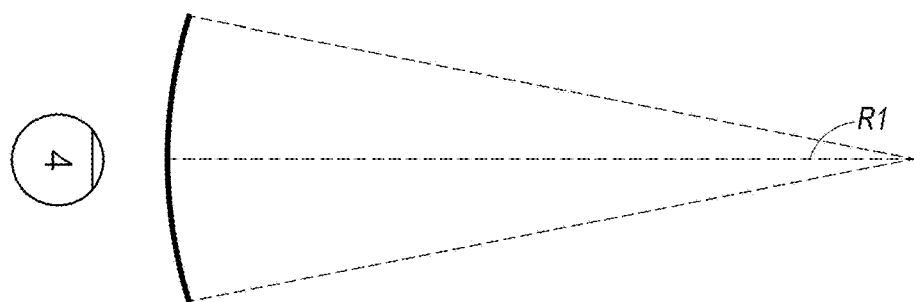
FIGS. 5A-5C illustrate relationships between radius of curvature and focal radius.
Figure 5B:
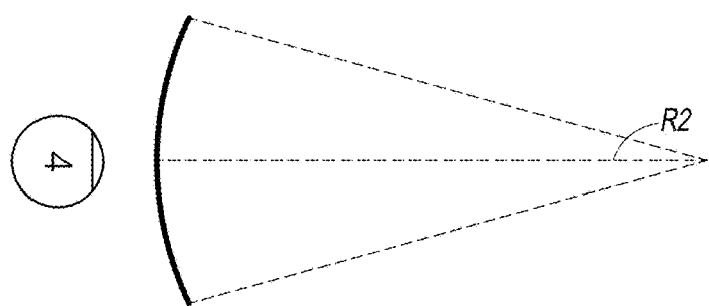
Figure 5C:
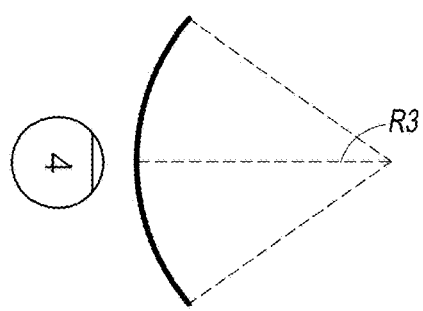

The distance between an object and the eye (4 or 6) can also change the amount of divergence of light from that object, as viewed by that eye. FIGS. 5A-5C illustrates relationships between distance and the divergence of light rays. The distance between the object and the eye (4) is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye (4). Consequently, at different depth planes, the degree of divergence of light rays is also different, with the degree of divergence increasing with decreasing distance between depth planes and the viewer's eye 4. While only a single eye (4) is illustrated for clarity of illustration in FIGS. 5A-5C and other figures herein, it will be appreciated that the discussions regarding eye (4) may be applied to both eyes (4 and 6) of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Figure 6:
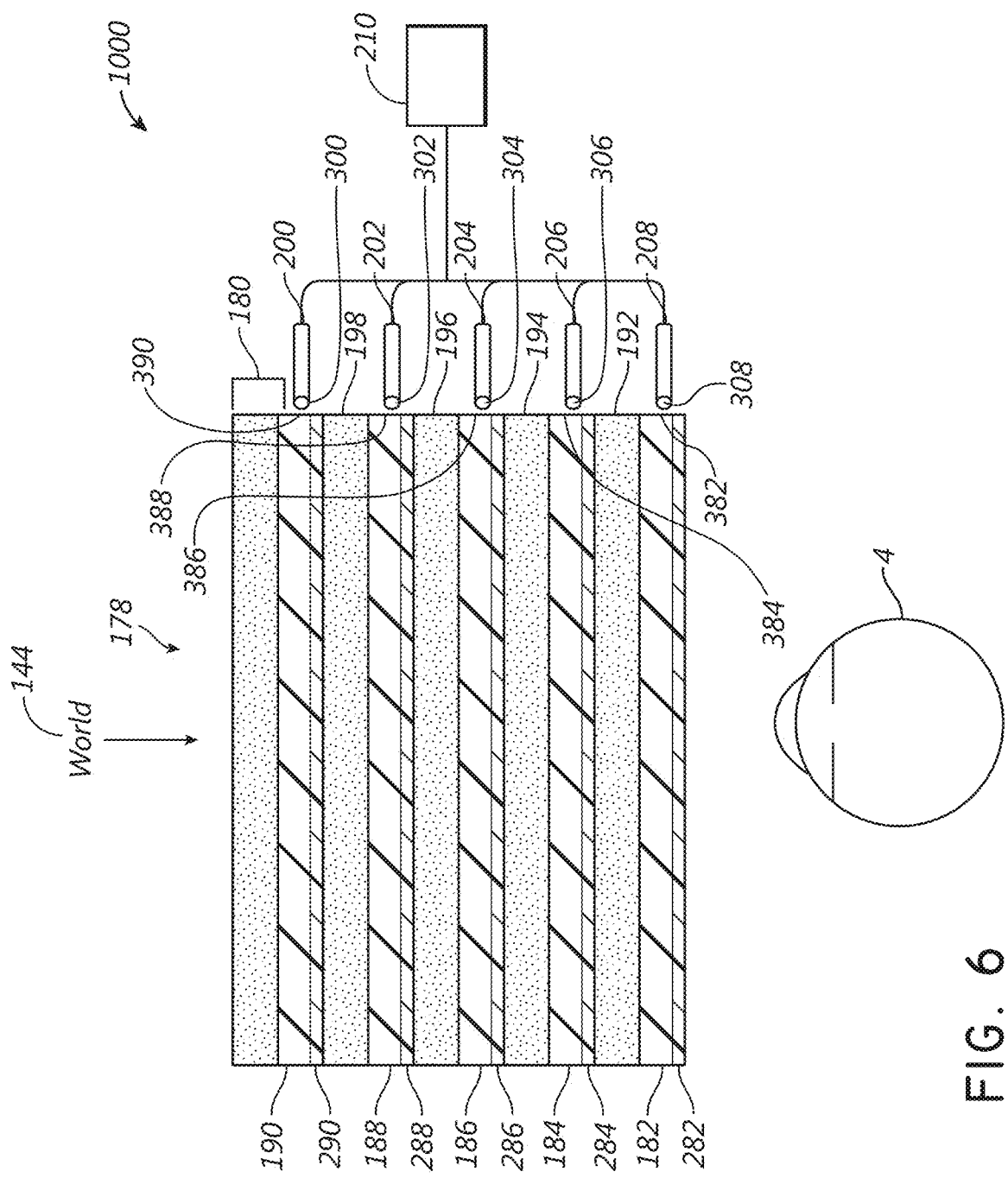
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, (178) that may be utilized to provide three-dimensional perception to the eye/brain using a plurality of waveguides (182, 184, 186, 188, 190). In some embodiments, the display system (1000) is the system (80) of FIG. 2, with FIG. 6 schematically showing some parts of that system (80) in greater detail. For example, the waveguide assembly (178) may be integrated into the display (62) of FIG. 2.

With continued reference to FIG. 6, the waveguide assembly (178) may also include a plurality of features (198, 196, 194, 192) between the waveguides. In some embodiments, the features (198, 196, 194, 192) may be lens. The waveguides (182, 184, 186, 188, 190) and/or the plurality of lenses (198, 196, 194, 192) may be configured to send image information to the eye with various levels of wavefront curvature or light ray divergence. Each waveguide level may be associated with a particular depth plane and may be configured to output image information corresponding to that depth plane. Image injection devices (200, 202, 204, 206, 208) may be utilized to inject image information into the waveguides (182, 184, 186, 188, 190), each of which may be configured, as described herein, to distribute incoming light across each respective waveguide, for output toward the eye 4. Light exits an output surface (300, 302, 304, 306, 308) of the image injection devices (200, 202, 204, 206, 208) and is injected into a corresponding input edge (382, 384, 386, 388, 390) of the waveguides (182, 184, 186, 188, 190). In some embodiments, a single beam of light (e.g. a collimated beam) may be injected into each waveguide to output an entire field of cloned collimated beams that are directed toward the eye (4) at particular angles (and amounts of divergence) corresponding to the depth plane associated with a particular waveguide.

In some embodiments, the image injection devices (200, 202, 204, 206, 208) are discrete displays that each produce image information for injection into a corresponding waveguide (182, 184, 186, 188, 190, respectively). In some other embodiments, the image injection devices (200, 202, 204, 206, 208) are the output ends of a single multiplexed display which may, e.g., pipe image information via one or more optical conduits (such as fiber optic cables) to each of the image injection devices (200, 202, 204, 206, 208).

A controller 210 controls the operation of the stacked waveguide assembly (178) and the image injection devices (200, 202, 204, 206, 208). In some embodiments, the controller 210 includes programming (e.g., instructions in a non-transitory medium) that regulates the timing and provision of image information to the waveguides (182, 184, 186, 188, 190) according to, e.g., any of the various schemes disclosed herein. In some embodiments, the controller may be a single integral device, or a distributed system connected by wired or wireless communication channels. The controller 210 may be part of the processing modules (70 or 72) (FIG. 2) in some embodiments.

The waveguides (182, 184, 186, 188, 190) may be configured to propagate light within each respective waveguide by total internal reflection (TIR). The waveguides (182, 184, 186, 188, 190) may each be planar or have another shape (e.g., curved), with major top and bottom surfaces and edges extending between those major top and bottom surfaces. In the illustrated configuration, the waveguides (182, 184, 186, 188, 190) may each include light extracting optical elements (282, 284, 286, 288, 290) that are configured to extract light out of a waveguide by redirecting the light, propagating within each respective waveguide, out of the waveguide to output image information to the eye 4. Extract light may also be referred to as outcoupled light and light extracting optical elements may also be referred to as outcoupling optical elements. An extracted beam of light is outputted by the waveguide at locations at which the light propagating in the waveguide strikes a light redirecting element. The light extracting optical elements (282, 284, 286, 288, 290) may, for example, be reflective and/or diffractive optical features. While illustrated disposed at the bottom major surfaces of the waveguides (182, 184, 186, 188, 190) for ease of description and drawing clarity, in some embodiments, the light extracting optical elements (282, 284, 286, 288, 290) may be disposed at the top and/or bottom major surfaces, and/or may be disposed directly in the volume of the waveguides (182, 184, 186, 188, 190). In some embodiments, the light extracting optical elements (282, 284, 286, 288, 290) may be formed in a layer of material that is attached to a transparent substrate to form the waveguides (182, 184, 186, 188, 190). In some other embodiments, the waveguides (182, 184, 186, 188, 190) may be a monolithic piece of material and the light extracting optical elements (282, 284, 286, 288, 290) may be formed on a surface and/or in the interior of that piece of material.

With continued reference to FIG. 6, as discussed herein, each waveguide (182, 184, 186, 188, 190) is configured to output light to form an image corresponding to a particular depth plane. For example, the waveguide (182) nearest the eye may be configured to deliver collimated light, as injected into such waveguide (182), to the eye (4). The collimated light may be representative of the optical infinity focal plane. The next waveguide up (184) may be configured to send out collimated light which passes through the first lens (192; e.g., a negative lens) before it can reach the eye (4); such first lens (192) may be configured to create a slight convex wavefront curvature so that the eye/brain interprets light coming from that next waveguide up (184) as coming from a first focal plane closer inward toward the eye (4) from optical infinity. Similarly, the third up waveguide (186) passes its output light through both the first (192) and second (194) lenses before reaching the eye (4); the combined optical power of the first (192) and second (194) lenses may be configured to create another incremental amount of wavefront curvature so that the eye/brain interprets light coming from the third waveguide (186) as coming from a second focal plane that is even closer inward toward the person from optical infinity than was light from the next waveguide up (184).

The other waveguide layers (188, 190) and lenses (196, 198) are similarly configured, with the highest waveguide (190) in the stack sending its output through all of the lenses between it and the eye for an aggregate focal power representative of the closest focal plane to the person. To compensate for the stack of lenses (198, 196, 194, 192) when viewing/interpreting light coming from the world (144) on the other side of the stacked waveguide assembly (178), a compensating lens layer (180) may be disposed at the top of the stack to compensate for the aggregate power of the lens stack (198, 196, 194, 192) below. Such a configuration provides as many perceived focal planes as there are available waveguide/lens pairings. Both the light extracting optical elements of the waveguides and the focusing aspects of the lenses may be static (i.e., not dynamic or electro-active). In some alternative embodiments, either or both may be dynamic using electro-active features.

With continued reference to FIG. 6, the light extracting optical elements (282, 284, 286, 288, 290) may be configured to both redirect light out of their respective waveguides and to output this light with the appropriate amount of divergence or collimation for a particular depth plane associated with the waveguide. As a result, waveguides having different associated depth planes may have different configurations of light extracting optical elements (282, 284, 286, 288, 290), which output light with a different amount of divergence depending on the associated depth plane. In some embodiments, as discussed herein, the light extracting optical elements (282, 284, 286, 288, 290) may be volumetric or surface features, which may be configured to output light at specific angles. For example, the light extracting optical elements (282, 284, 286, 288, 290) may be volume holograms, surface holograms, and/or diffraction gratings. Light extracting optical elements, such as diffraction gratings, are described in U.S. patent application Ser. No. 14/641,376, filed Mar. 7, 2015, which is incorporated by reference herein in its entirety. In some embodiments, the features (198, 196, 194, 192) may not be lenses; rather, they may simply be spacers (e.g., cladding layers and/or structures for forming air gaps).

In some embodiments, the light extracting optical elements (282, 284, 286, 288, 290) are diffractive features that form a diffraction pattern, or "diffractive optical element" (also referred to herein as a "DOE"). Preferably, the DOE's have a relatively low diffraction efficiency so that only a portion of the light of the beam is deflected away toward the eye (4) with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye (4) for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
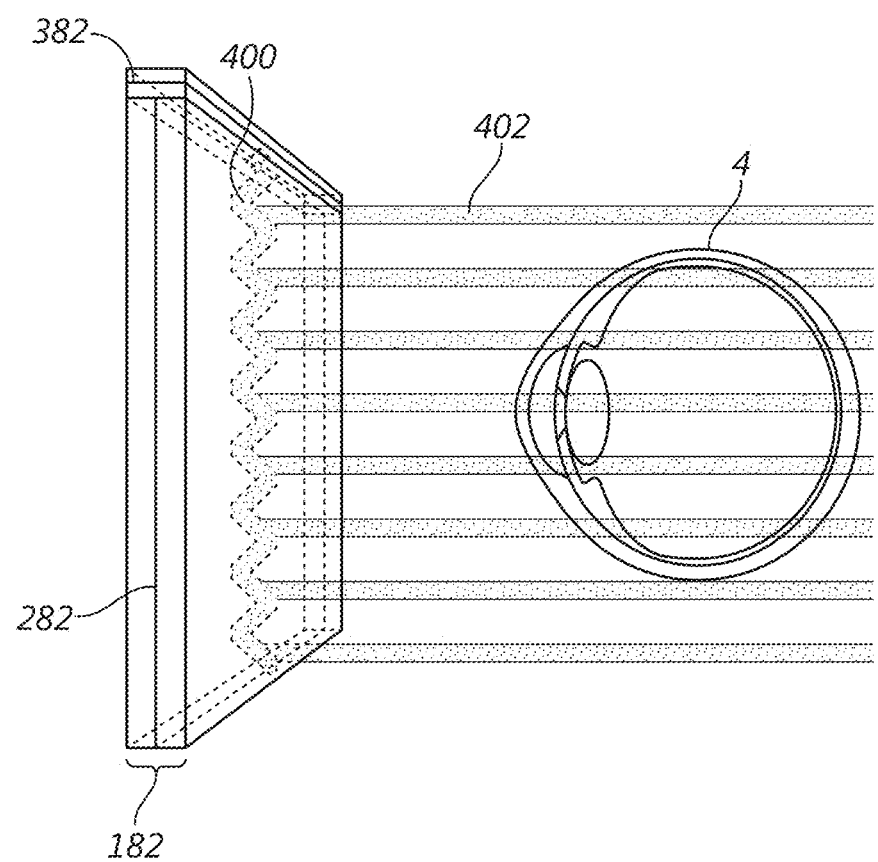
FIG. 7 shows an example of exit beams outputted by a waveguide.

FIG. 7 shows an example of exit beams outputted by a waveguide. One waveguide is illustrated, but it will be appreciated that other waveguides in the waveguide assembly (178) may function similarly, where the waveguide assembly (178) includes multiple waveguides. Light (400) is injected into the waveguide (182) at the input edge (382) of the waveguide (182) and propagates within the waveguide (182) by TIR. At points where the light (400) impinges on the DOE (282), a portion of the light exits the waveguide as exit beams (402). The exit beams (402) are illustrated as substantially parallel but, as discussed herein, they may also be redirected to propagate to the eye (4) at an angle (e.g., forming divergent exit beams), depending on the depth plane associated with the waveguide (182). It will be appreciated that substantially parallel exit beams may be indicative of a waveguide with light extracting optical elements that out-couple light to form images that appear to be set on a depth plane at a large distance (e.g., optical infinity) from the eye (4). Other waveguides or other sets of light extracting optical elements may output an exit beam pattern that is more divergent, which would require the eye (4) to accommodate to a closer distance to bring it into focus on the retina and would be interpreted by the brain as light from a distance closer to the eye (4) than optical infinity.

Figure 8:
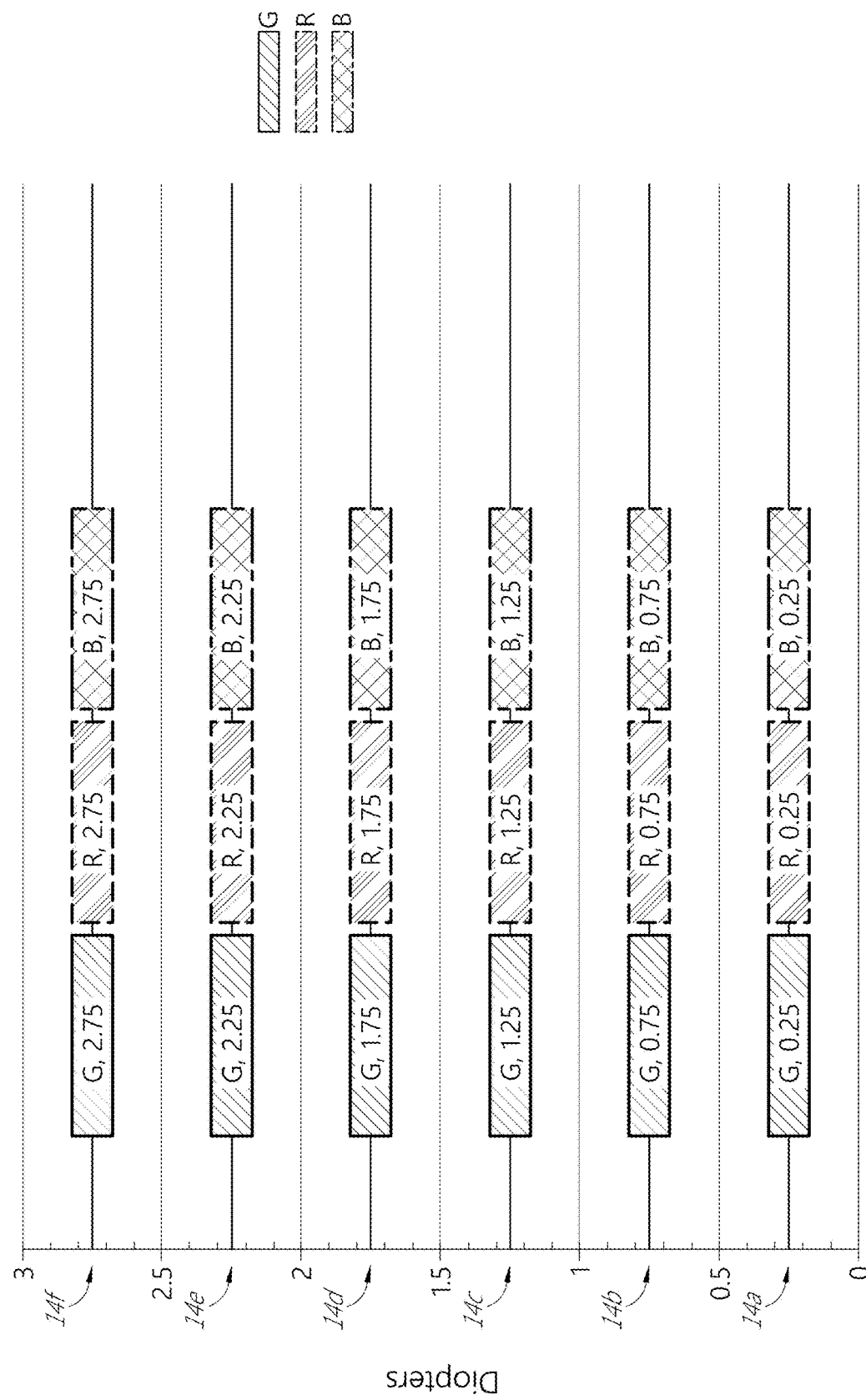
FIG. 8 illustrates an example of a waveguide stack in which each depth plane has three associated waveguides that each output light of a different color.

FIG. 8 schematically illustrates an example of a stacked waveguide assembly in which each depth plane has three associated waveguides that each output light of a different color. A full color image may be formed at each depth plane by overlaying images in each of multiple component colors, e.g., three or more component colors. In some embodiments, the component colors include red, green, and blue. In some other embodiments, other colors, including magenta and cyan, may be used in conjunction with or may replace one or more of red, green, or blue. In some embodiments, each waveguide may be configured to output a particular component color and, consequently, each depth plane may have multiple waveguides associated with it. Each depth plane may have, e.g., three waveguides associated with it, one for outputting red light, a second for outputting green light, and a third for outputting blue light. It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

With continued reference to FIG. 8, depth planes 14a-14f are shown. In the illustrated embodiment, each depth plane has three component color images associated with it: a first image of a first color, G; a second image of a second color, R; and a third image of a third color, B. As a convention herein, the numbers following each of these letters indicate diopters (1/m), or distance of the depth plane from a viewer, and each box in the figures represents an individual component color image. In some embodiments, G is the color green, R is the color red, and B is the color blue.

In some arrangements, each component color image may be outputted by a different waveguide in a stack of waveguides. For example, each depth plane may have three component color images associated with it: a first waveguide to output a first color, G; a second waveguide to output a second color, R; and a third waveguide to output a third color, B. In arrangements in which waveguide are used to output component color images, each box in the figures may be understood to represent an individual waveguide.

While the waveguides associated with each depth plane are shown adjacent to one another in this schematic drawing for ease of description, it will be appreciated that, in a physical device, the waveguides may all be arranged in a stack with one waveguide per level. Different depth planes are indicated in the figure by different numbers for diopters following the letters G, R, and B. As discussed herein, however, it would be beneficial to reduce the total number of waveguides in a waveguide stack.

For forming full color image using component colors, it has been believed that each component color should be outputted to form each image. Consequently, when using displays in which a dedicated waveguide outputs a particular component color, it has been believed that, to form an image on a particular depth plane, at least one waveguide should be available to output each component color. It has been found, however, that a reduced number of waveguides may be utilized while still providing good color resolution.

Figure 9:
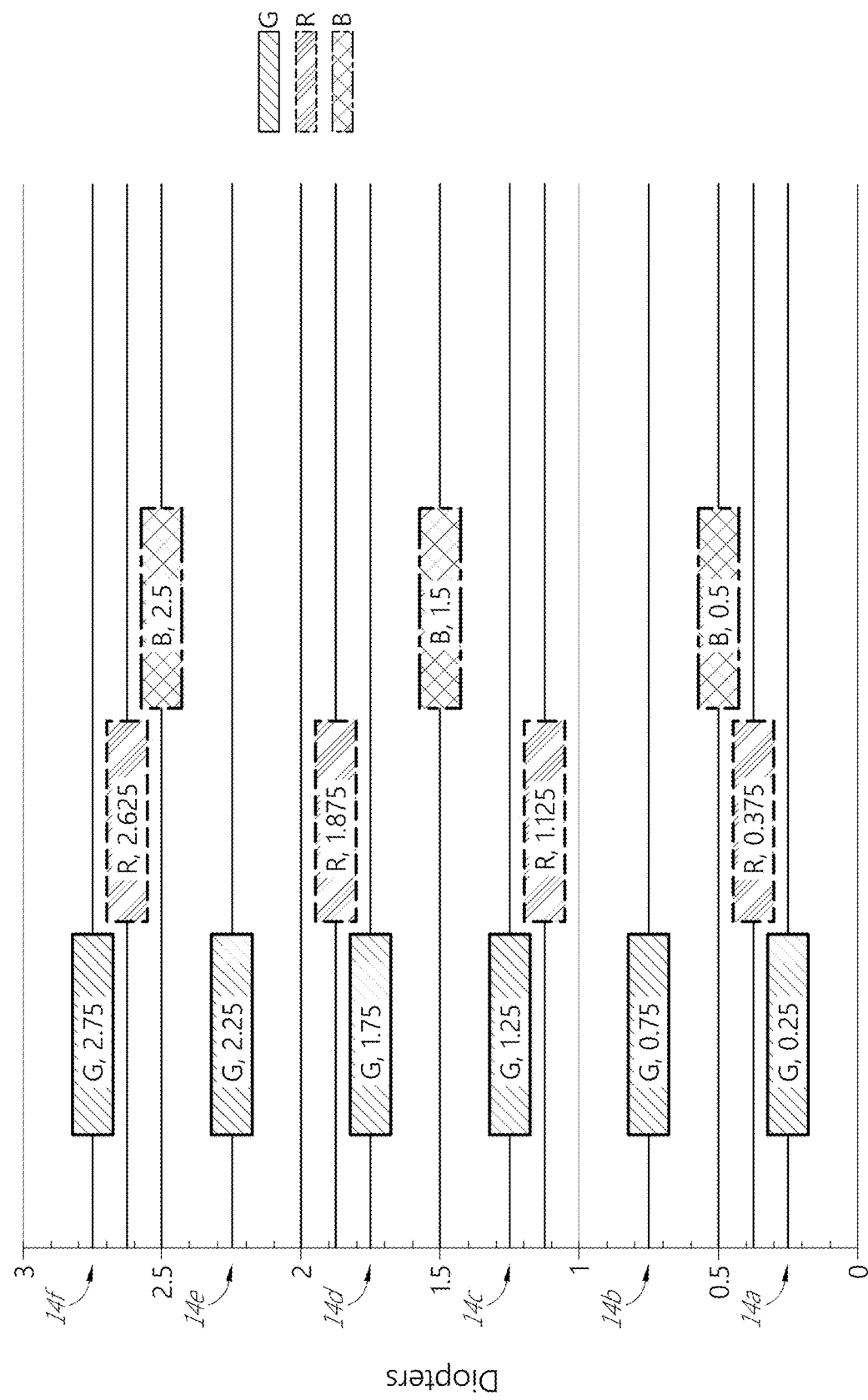
FIG. 9 illustrates an example of a waveguide stack in which different component colors have different numbers of associated waveguides.

In some embodiments, a stack of waveguides also referred to herein as a stacked waveguide assembly, includes an unequal number of waveguides to output light of different colors, or wavelength ranges. FIG. 9 illustrates an example of a waveguide stack in which different component colors have different numbers of associated waveguides. The waveguide stack may be part of the waveguide assembly 178 (FIG. 6). The stack of waveguides includes a first plurality of waveguides all indicated by the G, a second plurality of waveguides all indicated by the letter R, and a third plurality of waveguides all indicated by the letter B. For clarity of illustration, depth planes 14a-14f are shown, however, fewer or a greater number of depth planes are also contemplated. In addition, three component colors are illustrated, but fewer (e.g., two) or a greater number (e.g., four or more) of component colors are also contemplated.

Without being limited by theory, while forming a full color image preferably utilizes image information for each component color of the image, it has been found that this does not require that each depth plane has associated waveguides for every component color. Rather, it is believed that the eye has different sensitivities when focusing using different wavelengths or colors of light. For example, it is believed that the eye is highly sensitive to focusing using green light and has a shorter depth of focus and depth of field than, for example, for red light. Consequently, the eye may separately distinguish a greater number of more closely spaced depth planes at the wavelengths for green light in comparison to red light. The eye is believed to be less sensitive to focusing using red light, and even less sensitive to focusing with blue light. As a result, the range of distances for which objects are perceived by the eye to be in focus also varies with color and similarly the number of depth planes that are perceived varies with color; that is, the lower sensitivity to blue light indicates that an image presented using the light would be perceived to be in focus for a greater range of the depths than an image presented using red light or green light, and an image presented using red light would be perceived to be in focus for greater range of depth planes then an image presented using green light. As a result, as illustrated in FIG. 9, it is possible to present images that are perceived to have a good range of colors without outputting light for each component color at all depth planes having an associated waveguide.

With continued reference to FIG. 9, the first plurality of waveguides G includes a greater total number of waveguides than the second plurality of waveguides R. It will be appreciated that this difference alone beneficially reduces the total number of waveguides in a waveguide assembly relative to the configuration shown in FIG. 8. In some embodiments, the third plurality of waveguides B may have a different total number of waveguides than the first or second plurality of waveguides G or R. In some embodiments, the total number of waveguides corresponding to each component color may be selected based upon the sensitivity of the eye to focusing light corresponding to those colors and the associated depth of field, as discussed herein. For example, the total number of waveguides for outputting green light may be greater than that for outputting red light, which in turn is greater than that for outputting blue light.

In some embodiments, the waveguides for each component color may correspond to depth planes that are equally spaced apart. For example, as illustrated, waveguides G may be associated with depth planes spaced apart by 0.50 diopters while waveguides R are associated with depth planes spaced apart by 0.75 diopters, and waveguides B are associated with depth planes spaced apart by 1.0 diopters. In some embodiments, because the depth planes for the waveguides are not necessarily the same, it will be appreciated that the image information outputted by them may also be slightly different and may correspond to the particular depth plane associated with that waveguide.

In some other embodiments, the image information outputted by waveguides associated with neighboring depth planes may by identical, except for color. For example, each of the waveguides indicated by G, 0.25; R, 0.375; and B, 0.5 may be configured to output image information that is the same, other than color. For example, the controller 210 (FIG. 6) may be programmed to providing the otherwise same image information to these different waveguides. In such embodiments, the spacing between depth planes is chosen such that waveguides outputting similar image information are separated from one another by distances smaller than waveguides outputting image information for presentations of a different image on another depth plane.

It will be appreciated that different colors may be most sharply focused on depth planes that are not equally spaced apart. In some embodiments, the particular depth plane associated with a specific waveguide and color may be selected based upon the eye's ability to sharply focus particular depth planes using light of the color outputted by that waveguide. The particular depth planes, and their locations on the z-axis, associated with a waveguide for particular color light may be chosen based upon the depth of focus or field of the eye for that color. Consequently, in some embodiments, at least some of the waveguides of the first, second, and third pluralities of waveguides are associated with depth planes chosen to provide highly focused images using the color of light outputted by a corresponding waveguide. Additionally, in certain embodiments, waveguides of the first plurality of waveguides may be configured to provide images for depth planes that are unequally spaced apart; that is, the depth planes associated with the first plurality of waveguides may be unequally spaced apart. Similarly, the depth planes associated with the second and/or third pluralities of waveguides may also be unequally spaced apart. As used herein, with reference to a schematic plot such as FIG. 9, the spacing between two depth planes is the difference in diopters between those depth planes.

Figure 10:
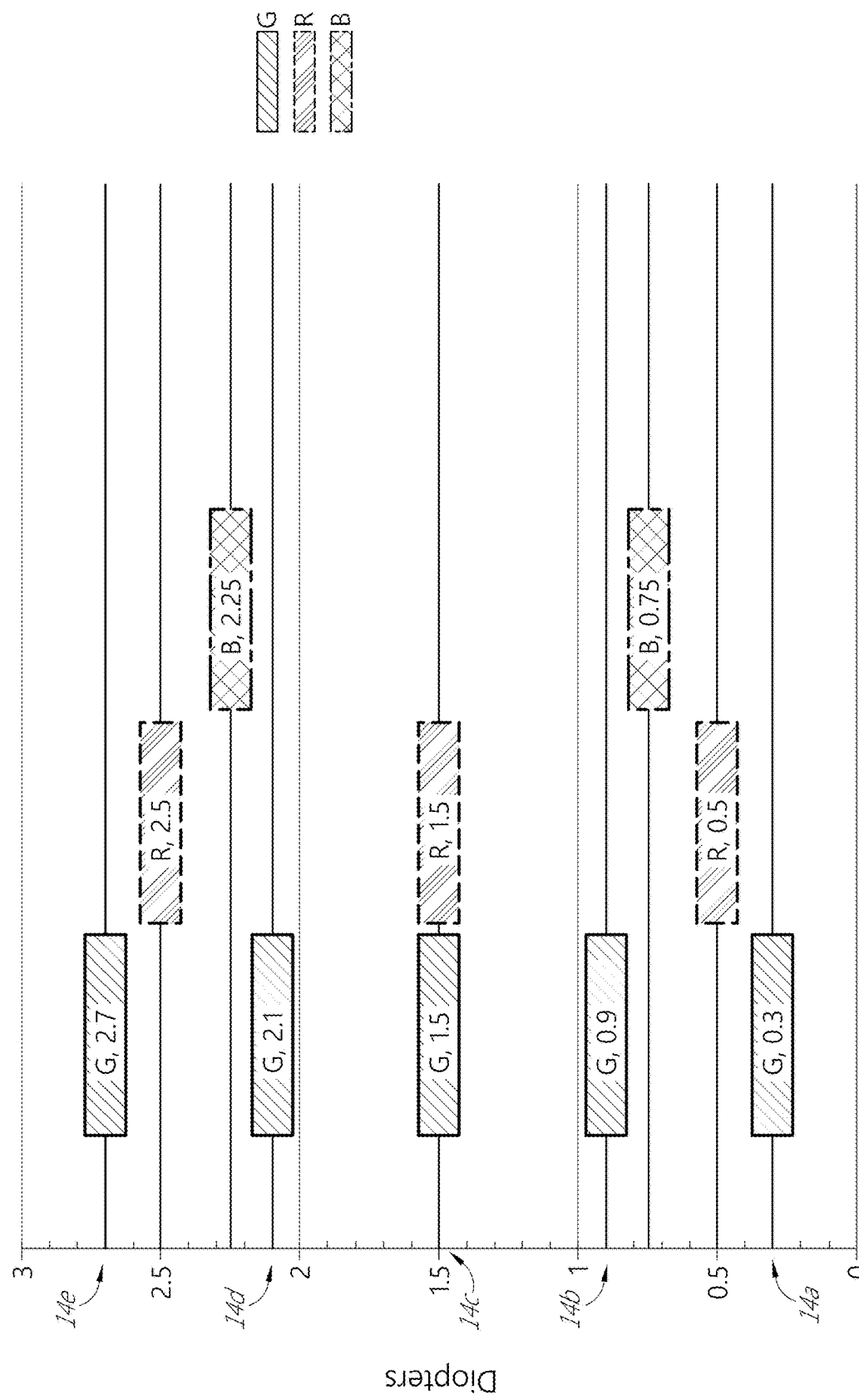
FIG. 10 illustrates another example of a waveguide stack in which different component colors have different numbers of associated waveguides.

FIG. 10 illustrates another example of a waveguide stack in which different component colors have different numbers of associated waveguides. In comparison to the configuration of FIG. 9, the configuration of FIG. 10 includes fewer waveguides and provides image information for fewer depth planes. As a result, the spacing between depth planes for different component colors is also different from that illustrated in FIG. 9. In some embodiments, this further reduction in the number of waveguides may be accomplished by a decrease in resolution in the z-axis or an increase in depth of field. As noted above, the illustrated waveguide stack may be part of the waveguide assembly 178 (FIG. 6).

While discussed with reference to waveguides, it will be appreciated that FIGS. 9 and 10 and the related description may be understood to relate to the component color images associated with depth planes generally, as discussed above regarding FIG. 8. For example, FIGS. 9 and 10 may be understood to illustrate the component color images associated with different depth planes, with or without a one-to-one correspondence between waveguides and depth planes and/or colors. For example, the different images may be directly outputted to a viewer by a display or relayed by an alternative optical means, without using a waveguide stack such as that illustrated in FIG. 6. For example, in some embodiments, a light modulator, such as a spatial light modulator, for generating images may be coupled to a variable focus element, with different component color images or sub-frames being placed at different focal distances (and different depth planes) by the variable focus element. Further details regarding such a spatial light modulator and variable focus element are disclosed in U.S. application Ser. No. 14/641,376 filed on Mar. 7, 2015 which is incorporated by reference as noted herein.

In some embodiments, a plurality of optical elements, e.g. DOE's, configured to output light for images of different component colors and/or set on a plurality of depth planes, may reside on a shared waveguide. Individual optical elements on the shared waveguide may be switched on to outcouple light to produce a component color image set on a particular depth plane, and then switched off when images for the particular depth plane are not desired. Different optical elements may be switched on and off at different times to output images corresponding to multiple different depth planes and/or different wavelength ranges, all from the shared waveguide. Additional details regarding optical elements on a shared waveguide to be found in U.S. patent application Ser. No. 14/641,376, filed Mar. 7, 2015. In certain embodiments, the switchable optical elements may allow the waveguide assembly (178) to include only a single waveguide (e.g. waveguide 182) while omitting other waveguides (e.g. waveguides 184, 186, 180, and 190).

In some embodiments, the light extracting optical elements may be selective for particular wavelengths of light and multiple sets of light extracting optical elements, each set selective for different wavelengths of light, may form part of a waveguide. In some embodiments, these optical elements are not switchable between on and off states. Light for forming different component color images may be outcoupled at different times by temporally sequencing image information that is provided to the waveguide. In some embodiments, these optical elements may be diffractive optical elements.

As noted above, the number of waveguides in a waveguide stack (or the total number of component color images utilized across a plurality of depth planes) may advantageously be reduced by taking advantage of the sensitivity of the eye for focusing particular wavelengths or colors of light. In some other embodiments, this reduction in the number of waveguides or component color images (as illustrated in, e.g., FIGS. 9 and 10) may be facilitated by manipulating other properties of the display system in addition to or as an alternative to considerations regarding the non-uniform sensitivity of the eye for focusing using different colors and the associated different depth of fields for the eye.

In some embodiments, the number of depth planes perceived by the eye may be manipulated by increasing the depth of field, or depth of focus, of the eye. For example, the exit pupil for one or more waveguides may be decreased to increase the depth of focus. It will be appreciated that light propagates through the display system (1000) and out of the waveguide to the eye (4). This light passes through an exit pupil as it propagates from a light source to the eye (4). In some embodiments, the exit pupil may be set by an aperture disposed in the optical path between an output surface of a waveguide and a display for generating image information to be injected into the waveguide. In some embodiments, the aperture may have a fixed size.

In some other embodiments, the aperture may have a dynamically variable size that may be set by the controller (210) (FIG. 6). For example, a variable aperture may comprise an electronically adjustable iris, a spatial light modulator, shutters (e.g., liquid crystal shutters) with concentric zones, etc. In some other embodiments, a plurality of light sources of different characteristics (e.g., different numerical apertures) can be configured to couple light into the same waveguide. By switching or alternating which light source is illuminated, the numerical aperture and the beam diameter at the waveguide injection area (and subsequently propagating through the waveguide) may be changed. In some embodiments that use a fiber scanned display (FSD) as the image source, the FSD may comprise multiple cores with different mode field diameters and numerical apertures. By changing which core is illuminated, the beam diameter may be changed and, thus, the size of the light beam coupled into the waveguide and propagating through the waveguides may be changed. Examples of light sources having different characteristics are disclosed in U.S. Provisional Application No. 62/156,809, filed May 4, 2015, the entire disclosure of which is incorporated by reference herein.

In some embodiments, reducing the exit pupil for waveguides corresponding to all component colors can reduce the number of perceived depth planes generally. For example, with reference to FIG. 8 where six depth planes associated with waveguides are illustrated, it may be possible to reduce the total number of associated depth planes by reducing the exit pupil size. Thus, even where waveguides for all component colors are provided for all associated depth planes, a reduction in the total number of waveguides may be achieved. However, as discussed herein, because the eye may distinguish fewer depth planes for some colors than others, the number of depth planes corresponding to some colors may be reduced. Accordingly, in some example embodiments, by reducing the depth of field for a viewer's eye, it may be possible to go from the configuration of FIG. 9 to the further reduced configuration of FIG. 10, without an appreciable reduction in image quality or the perception of depth. In some embodiments, the exit pupil may be different depending on the color or wavelengths of light outputted by a waveguide. For example, waveguides for outputting some colors of light may have smaller exit pupils than waveguides outputting other colors of light.

It will be appreciated that the depth of field of the viewer's eyes may also be changed by reducing the pupil sizes of the eyes. In some embodiments, this may be accomplished by, e.g., increasing the brightness of the images outputted by the waveguides, thereby causing the viewer's pupils to constrict.

In some embodiments, the waveguides may be configured to output light beams (FIG. 7) that are smaller than the size of the viewer's pupils. Exit beams smaller than the viewer's pupils can provide a similar effect on depth of field as using a small exit pupil or constricting the sizes of viewer's pupils. In some embodiments, the widths of the exit beams may vary and be different depending on the color or wavelengths of light outputted by a waveguide. For example, waveguides for outputting some colors of light (e.g. colors to which the eye is more sensitive for focusing) may have smaller exit beam widths than waveguides outputting other colors of light (e.g. colors which die is relatively less sensitive for focusing).

With a small beam size, it is possible that multiple similar beams may enter the eye, which may cause undesirable visual artifacts. In some embodiments, the light extracting optical elements of the waveguides may be configured to direct only a single beam of light to the eye at a time, e.g., by appropriately spacing the location of the exit beams. In some embodiments, the width of the exit beam may be set by injecting a collimated beam of light into the waveguide, with the collimated beam having the desired width for the exit beam. Because the injected light beam is collimated, the widths of exit beams may be expected to remain substantially similar over the entire output area of the waveguide. In some embodiments, the light extracting optical elements may be configured to interact with the injected light beam to provide an exit beam of a desired size. For example, the light extracting optical elements may be configured to modify (e.g., reduce) the width of the exit beam, relative to the width of the injected light beam. For example, two light extracting optical elements in series (one to cause the beam to converge and one to recollimate) may be used to reduce the size of the exit beam, or the two light extracting optical elements may include one to cause the beam to diverge and one to recollimate (to increase the width). It will be appreciated that a reduction in width will increase the depth of field. Similarly, spacing apart the redirecting elements can be used to space apart the exit beam such that only one beam passes through the pupil of the eye. In addition, the spacing between exit beams may be controlled by controlling the frequency which the collimated beam strikes a light redirecting element as it propagates through the waveguide by TIR.

In some embodiments, the number of times that a collimated beam of light strikes a light redirecting element may be selected by selecting the angle at which the collimated beam is injected into the waveguide and/or by using light turning features that receive injected light and direct the light through the waveguides at desired angles. For example, the collimated beams injected into the waveguide and striking a major surface of the waveguide at shallow angles (relative to the major surface) may be expected to propagate a greater distance before striking the major surface again, relative to light that is injected into the waveguide to strike the major surface at smaller angles as measured with respect to the normal to the major surface. In some systems, the angle at which light is injected into the waveguide determines the pixel it represents. In such systems, an active optical element in the waveguide (e.g., a switchable DOE) may be used to deflect the beam back to its intended angle to represent the correct pixel in space.

It will be appreciated that the locations and spacings of exit beams may be adjusted using various other schemes. For example, waveguides incorporating volume phase holograms can be highly angularly selective. Such holograms may be configured to suppress the out-coupling of some beams, at some locations, while selectively coupling out other beams at other locations. In some other embodiments that use a waveguide with a switchable DOE for outcoupling, the DOE may be divided into locally addressable cells or regions, such that regions of the DOE can be turned off (preventing beams from coupling out from that region) while other regions are turned on to outcouple one or more beams. In some embodiments, a scanned beam display, such as a fiber scanned display, may be coupled into the locally addressable waveguide and synchronized such that different DOE cells are activated. The different DOE cells may be activated as a function of beam angle injected into the waveguide. In some other embodiments, a shutter array (or SLM) may be disposed between the waveguides and the eye, to selectively attenuate some beams, while allowing others to pass.

In some embodiments, the exit beam width is about 7 mm or less, about 5 mm or less, or about 3 mm or less, 2 mm or less, 1 mm or less or ranges between any combination of these values. In some embodiments, the width of the exit beam may be varied using variable apertures in the optical path of light between a light source and the injection of light into a waveguide. For example, a variable aperture may be provided in the image injection devices (200, 202, 204, 206, 208) (FIG. 6). For example, the variable apertures may be provided at the output surfaces (300, 302, 304, 306, 308) of the image injection devices (200, 202, 204, 206, 208).

The various approaches disclosed herein for increasing depth of field may advantageously be applied to one or more pluralities of waveguides for outputting one or more particular colors, respectively, to allow waveguides for those colors to be decreased in number. In some embodiments, these approaches for increasing depth of field may be applied in conjunction with the differences in sensitivity of the eye to focusing light of different colors, thereby further allowing decreases in the total waveguide number. For example, FIG. 9 may be considered to be a waveguide stack that takes advantage of the differences in sensitivity of the eye to different colors, and FIG. 10 may be considered to be a waveguide stack that takes advantage of approaches for increasing the depth of field with reduced aperture size and also the differences in sensitivity of the eye to different colors.

In some embodiments, the approaches disclosed herein for increasing depth of field may be applied as desired to decrease the number of waveguides (or component color images) associated with a chosen color. For example, green light emitters, for providing green colored image information to waveguides, may be more costly than red light emitters. The sensitivity of the eye to focusing with green light would be expected to dictate that waveguides for outputting green light would be the greatest in number. However, by applying one or more of the approaches disclosed herein for increasing depth of field to waveguides for the color green (e.g., reducing the aperture size), the total number of those waveguides may be decreased (e.g., to a number less than the number of red waveguides), thereby reducing the number of green light emitters, which in turn reduces the costs of systems using these parts. As a result, in some embodiments, waveguides in various pluralities of waveguides for outputting different colors may have different associated exit pupil sizes and/or different exit beam sizes. For example, the total number of waveguides in a particular plurality of waveguides may be directly related to the exit pupil size and/or beam size associated with waveguides of a particular plurality of waveguides. In some embodiments, waveguides having a relatively large associated exit pupil size have a greater total number than waveguides having a relatively small exit pupil size.

It will be appreciated that reducing the number of depth planes represented by the waveguides may cause images outputted by some waveguides to be out of focus relative to images of other colors for the same the depth plane. In conjunction with or as an alternative of taking advantage of the eye's different sensitivities for focusing different colors and/or manipulating the depth of field for some or all waveguides, the sensitivity of the eye to defocus may be decreased in some embodiments. The sensitivity may be decreased by intentionally introducing aberrations, such as blur, for images outputted by some or all waveguides in a waveguide stack. For example, blur may be introduced for one or more pluralities of waveguides having relatively low total numbers. In some embodiments, for a display system using red-green-blue component colors, blur may be introduced to images outputted by waveguides associated with the color blue, which may have few total numbers than waveguides than waveguides associated with the color red or green. In some embodiments, the amount of blur introduced may vary with the color light outputted by a waveguide. For example, the amount of introduced blur may be directly related to the number of waveguides associated with a particular color; the fewer the number of waveguides for a particular color, the greater the amount of introduced blur to images outputted by those waveguides. In some embodiments, blur may be introduced for images of each component color, with the amount of blur varying depending on color. For example, component color images of a color to which the human eye is very sensitive may have higher levels of introduced blur than component color images of a color to a study is relatively less sensitive.

In some embodiments, blur may be introduced by one or more optical elements and/or by image processing electronics. For example, where image information is provided to a waveguide by incoupling beams of light into a waveguide (such as with a FSD), the focus of the beams to be coupled into the waveguide may be adjusted away from collimation. A collimated beam creates the smallest spot for beams coupled out from the waveguide and viewed. A non-collimated beam injected into the waveguide will still produce pixels at the correct locations, but the spot size will grow, adding blur. In some embodiments, an optical element may be used before in coupling light beams (e.g., disposed at the light input surface of the waveguides) to adjust the focus of light beams such that they are adjusted away from collimation, thereby introducing blur to image information received from the image injection devices (200, 202, 204, 206, 208) (FIG. 6) and/or the image injection devices (200, 202, 204, 206, 208). In some other embodiments, the optical element to introduce blur may be disposed at other parts of the optical path between a display for generating images and the output of image information from a waveguide to a viewer's eyes.

In addition to, or as an alternative to, use of an optical element for introducing blur, blur may be introduced electronically, e.g., in image processing in the processing modules (70) or (72) (FIG. 2). The electronic introduction of blur can allow blur to be changed dynamically based, e.g., upon image content. For example, some images may be determined to be less susceptible to a perceived loss of sharpness, e.g., images having less detail or information. For such images, the amount of blur may be increased without appreciable decreases in image quality in some embodiments.

In some embodiments, sensitivity to defocus may be decreased by decreasing the x-y resolution (e.g., the pixel resolution) of images outputted by the waveguides. For example, this may effectively be accomplished by increasing the sizes of individual pixels. In some embodiments, pixel size may be increased by increasing the sizes of optical fibers providing image information to the waveguides. For example, a scanning fiber display may contain multiple fiber cores, each of which has a different mode field diameter and, thus, a different effective spot size or pixel size. In some embodiments, the sizes of the pixels may vary depending on the color of light outputted by the waveguides of a waveguide stack. For example, the fewer the number of waveguides for a particular color, the greater the size of individual pixels (and the lower the x-y resolution) for images outputted by those waveguides. In some embodiments, differences in the sizes of pixels may be established using differently sized subpixels in spatial light modulators (SLM) that produce the images. For example, e.g., blue sub-pixels may be physically larger than green subpixels, and/or may be fewer in count and/or more sparsely distributed across the SLM. Alternatively, or in addition, it will be appreciated that the pixel resolution may be changed dynamically by image processing modules in some embodiments. For example, as with blur, some images may be determined to be less susceptible to a perceived loss of pixel resolution, e.g., images having less detail or information. As a result, the pixel resolution may be dedecreased without appreciable decreases in image quality in some embodiments.

Figure 11:
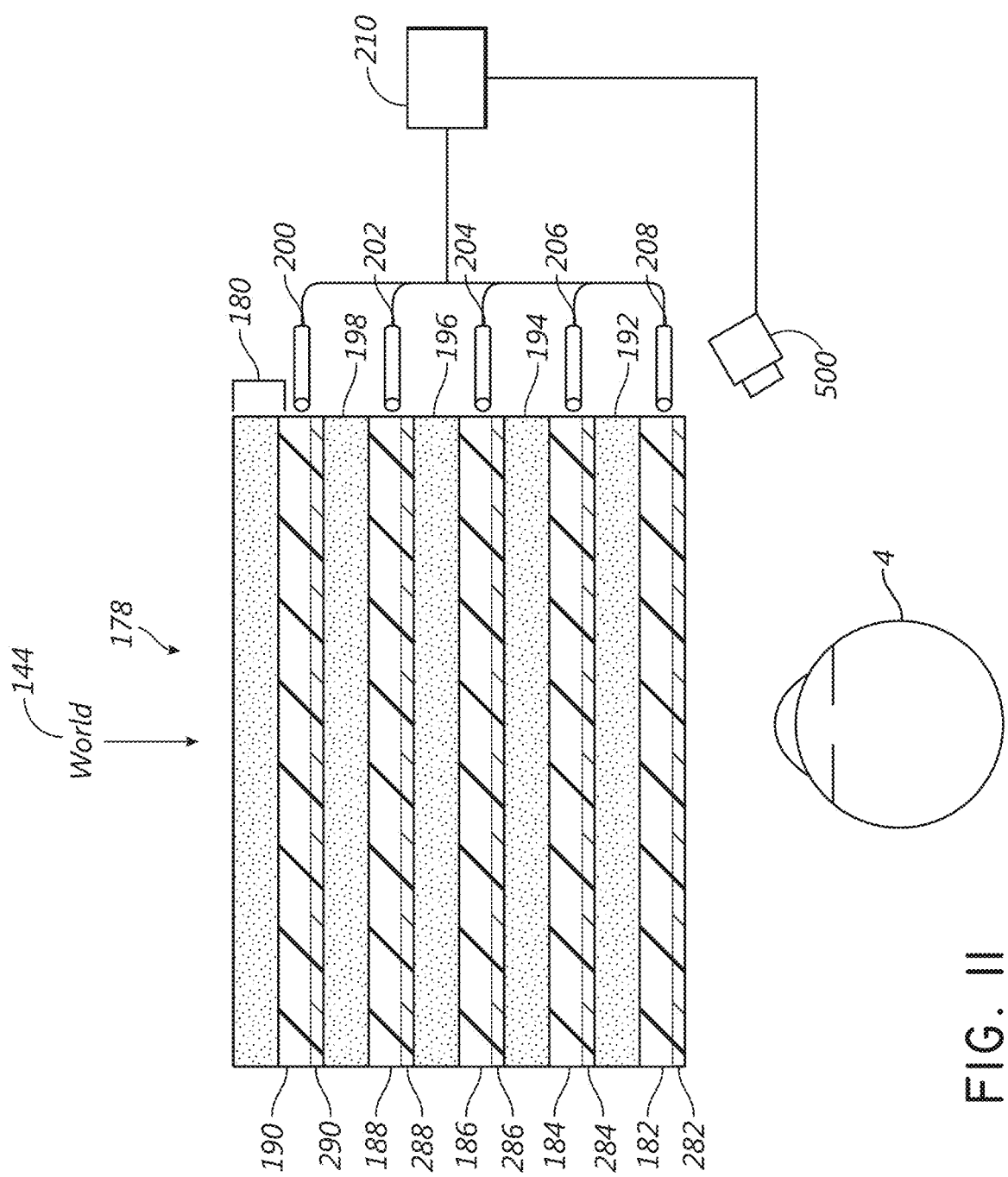
FIG. 11 illustrates an example of a display system configured to monitor pupil size.

In some embodiments, the number and distribution of depth planes and/or depth of field may be varied dynamically based on the pupil sizes of the eyes of the viewer. FIG. 11 illustrates an example of a display system configured to monitor pupil size. A camera (500) (e.g., a digital camera) captures images of the eye (4) to determine the size of the pupil of the eye 4. In some embodiments, the camera (500) may be attached to the frame (64) (FIG. 2) and may be in electrical communication with the processing modules (70) and/or (72), which may process image information from the camera (500) to determine the pupil diameters of the eyes of the user (60). In some embodiments, one camera (500) may be utilized for each eye, to separately determine the pupil size of each eye, thereby allowing the presentation of image information to each eye to be dynamically tailored to that eye. In some other embodiments, the pupil diameter of only a single eye (4) (e.g., using only a single camera (500) per pair of eyes) is determined and assumed to be similar for both eyes of the viewer (60).

As discussed herein, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, referring again to FIG. 8, a viewer may not be able to clearly perceive the details of both depth planes 14a and 14b at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size, or upon receiving electrical signals indicative of particular pupil sizes. For example, if the user's eyes are unable to distinguish between two depth planes associated with two waveguides, then the controller (210) (FIG. 6) may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

As discussed herein, in some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture, as discussed herein.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while individual waveguides are discussed in some embodiments as outputting a one specific color of light, in some other embodiments, at least some of the waveguides may be configured to output light of more than one color. For example, in some embodiments, a volumetric material having light extracting optical elements within it (e.g., a volume hologram) may be utilized to selectively redirect light of different wavelengths out of a waveguide. The use of a waveguide to output light of different colors can allow fewer today waveguides to be used in a waveguide stack.

It will be appreciated that one goal for the spacing between depth planes is to provide spacings in which an object appears to smoothly transition from near to far without salient jumps in perceived focus. A "depth blending" approach may be used to increase the smoothness of the transition between viewing nearer and farther parts of a object. For example, given a finite number of depth planes, as disclosed herein, it is possible that some points on an object may lie between two depth planes, and image information regarding these points may be available. In some embodiments, these points may have their luminance distributed between the two neighboring planes; e.g., a point halfway between two depth planes in diopter space can have half of its luminance on the first of those two planes and half on the second of those two planes. By distributing the luminance of points, which are in between immediately neighboring depth planes, between those depth planes, the smoothness of the transition between the depth planes may be increased.

In some embodiments, multiple waveguides in a waveguide stack may have the same associated depth plane. For example, multiple waveguides configured to output the same color may be set to the same depth plane. This can provide advantages for forming a tiled image to provide an expanded field of view at that depth plane.

As discussed herein, in some embodiments, the display may present the same number of identically-spaced depth planes, with the same progression of focal distances, to the left and right eyes of a viewer. In some other embodiments, one or more of the total number, the separation between, and the focal distances associated with the depth planes presented to the left and right eyes of the viewer may be different. For example, a larger number of depth planes may be presented to the right eye than to the left eye, or vice versa, such the progression of focal distances between depth planes of the right and left eye are different. Without being limited by theory, it is believed that stereopsis may mask the reduced number of depth planes in one eye. The differences in the depth plane number, separation, and/or focal distance may exist for all component colors, or may be limited to one or more particular component colors, e.g., green. As an example, in some embodiments, one eye may be presented with depth planes as shown in FIG. 9, while another eye may be presented with depth planes as shown in FIG. 10.

While illustrated as a wearable system as an advantageous example, the waveguides and related structures and modules disclosed herein may be applied to form a non-wearable display. For example, rather than being accommodated in a wearable frame (64) (FIG. 2), the display (62) may be attached to a stand, mount, or other structure that supports the display (62) and allows the display (62) to provide images to a viewer (60) without being worn be the viewer (60).

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A display system comprising:
    a stack of waveguides comprising:
        a first plurality of waveguides each configured to produce an image formed of a first component color by outputting light of a first wavelength range; and
        a second plurality of waveguides each configured to produce an image formed of a second component color by outputting light of a second wavelength range,
        a third plurality of waveguides each configured to display an image formed of a third component color by outputting light of a third wavelength range,
        wherein the first plurality of waveguides totals to a greater number of waveguides than the second plurality of waveguides, wherein the third plurality of waveguides totals to a different number of waveguides than the first or second pluralities of waveguides.

2. The system of claim 1, wherein the first, second, and third wavelength ranges correspond to different first, second, and third colors, respectively, wherein the third color is red.

3. The system of claim 2, wherein the second color is selected from the group consisting of blue and green, and the first color is the other color from the group consisting of blue and green.

4. The system of claim 3, wherein the third plurality of waveguides totals to a same number of waveguides as one of the first or second pluralities of waveguides.

5. The system of claim 1, wherein each waveguide of the first plurality of waveguides has an associated depth plane, wherein each waveguide of the first plurality of waveguides is configured to produce an image appearing to originate from that waveguide's associated depth plane, and wherein each waveguide of the first plurality of waveguides has a different associated depth plane from each other waveguide of the first plurality of waveguides;
    wherein each waveguide of the second plurality of waveguides has an associated depth plane, wherein each waveguide of the second plurality of waveguides is configured to produce an image appearing to originate from that waveguide's associated depth plane, and wherein each waveguide of the second plurality of waveguides has a different associated depth plane from each other waveguide of the second plurality of waveguides; and wherein each waveguide of the third plurality of waveguides has an associated depth plane, wherein each waveguide of the third plurality of waveguides is configured to produce an image appearing to originate from that waveguide's associated depth plane, and wherein each waveguide of the third plurality of waveguides has a different associated depth plane from each other waveguide of the third plurality of waveguides.

6. The system of claim 5, wherein a spacing between depth planes is different for each of the first, second, and third pluralities of waveguides.

7. The system of claim 5, wherein each waveguide of the first, second, and third pluralities of waveguides comprises light extracting optical elements, wherein a configuration for the light extracting optical elements varies depending on the depth plane associated with the waveguide, wherein the light extracting optical elements for different depth planes have different optical power so as to provide different divergence of exiting light for each depth plane.

8. The system of claim 1, further comprising an exit pupil associated with each waveguide of the first and second pluralities of waveguides, wherein exit pupil sizes for waveguides of the first plurality of waveguides are larger than exit pupil sizes for waveguides of the second plurality of waveguides.

9. The system of claim 1, wherein each waveguide of the first and second pluralities of waveguides outputs light with an exit beam size, wherein the exit beam size for waveguides of the first pluralities of waveguides is less than 5 mm.

10. The system of claim 1, further comprising image injection devices, each image injection device configured to inject image information into a corresponding input area of each of the first and second pluralities of waveguides.

11. The system of claim 10, wherein the image injection devices comprise a variable aperture for light injected into the corresponding input areas of the first and second pluralities of waveguides.

12. The system of claim 1, further comprising:
another stack of waveguides,
wherein the stack of waveguides is configured to direct image information to a first eye of a viewer and the other stack of waveguides is configured to direct image information to a second eye of the viewer.

13. The system of claim 12, wherein the stack of waveguides and the other stack of waveguides are configured to produce images set on a plurality of depth planes, wherein one or more of the following is different between the depth planes of the stack of waveguides and depth planes of the other stack of waveguides:
distances between depth planes; and
a total number of depth planes.

14. The system of claim 1, wherein each of the waveguides is configured to propagate light therein by total internal reflection, each waveguide comprising:
diffractive optical elements configured to redirect light, propagating within the waveguide, out of the waveguide towards a viewer.

15. The system of claim 1, further comprising optical elements or an image processing module for introducing blur to image information injected into the waveguides.

16. The system of claim 15, wherein the optical elements or image processing module are configured to introduce different amounts of blur to waveguides of the first and second pluralities of waveguides.

17. The system of claim 15, wherein the optical elements or image processing module are configured to introduce different amounts of blur to waveguides of the first, second, and third pluralities of waveguides.

18. The system of claim 1, wherein a first pixel size for the image produced by the first plurality of waveguides is smaller than a second pixel size for the image produced by the second plurality of waveguides.

19. The system of claim 1, wherein a third pixel size for the image produced by the third plurality of waveguides is different than the first or second pixel sizes.

20. The system of claim 1, further comprising a controller configured to distribute, between two neighboring depth planes, the luminance of a point lying between the neighboring depth planes, such that half the luminance of the point is split to the first of the two neighboring depth planes, and half the luminance of the point is split to the second of the two neighboring depth planes.

* * * * *